(12) United States Patent
Itoh

(10) Patent No.: US 7,782,495 B2
(45) Date of Patent: Aug. 24, 2010

(54) FACSIMILE COMMUNICATION METHOD, FACSIMILE APPARATUS AND COMPUTER-READABLE STORAGE MEDIUM CONFIGURED TO OUTPUT COMMUNICATION RESULT NOTIFICATION

(75) Inventor: Nobuhiro Itoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1520 days.

(21) Appl. No.: 10/685,098

(22) Filed: Oct. 14, 2003

(65) Prior Publication Data

US 2004/0075871 A1  Apr. 22, 2004

(30) Foreign Application Priority Data

Oct. 18, 2002  (JP) ............... 2002-304964

(51) Int. Cl.
*H04N 1/00* (2006.01)
(52) U.S. Cl. .................. 358/440; 358/439; 358/444; 358/468
(58) Field of Classification Search ......... 358/400–405, 358/434–444, 468
See application file for complete search history.

(56) References Cited

U.S. PATENT DOCUMENTS

| | | | | |
|---|---|---|---|---|
| 5,224,156 | A * | 6/1993 | Fuller et al. | 358/440 |
| 5,351,136 | A * | 9/1994 | Wu et al. | 358/440 |
| 5,404,231 | A * | 4/1995 | Bloomfield | 358/400 |
| 5,566,230 | A * | 10/1996 | Cairo | 358/400 |
| 5,701,183 | A * | 12/1997 | Bellemare et al. | 358/440 |
| 5,809,116 | A * | 9/1998 | Cairo | 358/400 |
| 5,815,555 | A * | 9/1998 | Cairo | 358/400 |
| 6,025,931 | A * | 2/2000 | Bloomfield | 358/402 |
| 6,684,368 | B1 * | 1/2004 | Hull et al. | 358/402 |
| 6,882,450 | B1 * | 4/2005 | Baba | 358/440 |
| 7,046,791 | B2 * | 5/2006 | Itoh | 379/373.03 |
| 2002/0094076 | A1 * | 7/2002 | Chen | 379/373.01 |
| 2003/0020960 | A1 * | 1/2003 | Tanimoto | 358/402 |
| 2005/0036167 | A1 * | 2/2005 | Atsumi | 358/440 |

FOREIGN PATENT DOCUMENTS

| | | |
|---|---|---|
| JP | 4-369966 | 12/1992 |
| JP | 6-268827 | 9/1994 |
| JP | 7-143302 | 6/1995 |

OTHER PUBLICATIONS

U.S. Appl. No. 10/054,147 of Itoh, filed Jan. 21, 2002.
U.S. Appl. No. 10/217,322 of Itoh, filed Aug. 12, 2002.
Dec. 25, 2007 Japanese official action in connection with corresponding Japanese patent application No. 2002-304964.

* cited by examiner

*Primary Examiner*—Twyler L Haskins
*Assistant Examiner*—Nicholas C Pachol
(74) *Attorney, Agent, or Firm*—Cooper & Dunham LLP

(57) ABSTRACT

A facsimile apparatus is provided with a specific destination name storage section to store destination names of specific destinations, a receiving end identifying section to identify a receiving end by analyzing terminal information received from the receiving end when making a facsimile transmission to the receiving end, a specific destination identifying section to search from the specific destination name storage section a destination name corresponding to the receiving end which is identified by the receiving end identifying section, and a notifying section to output a communication result notification indicative of a result of the facsimile transmission to the receiving end only when the specific destination identifying section finds the corresponding destination name in the specific destination name storage section.

33 Claims, 4 Drawing Sheets

DOCUMENT TRANSPORT DIRECTION

| <TRANSMISSION CONFIRMATION CONDITIONS> | SET EACH ITEM |
|---|---|
| SPECIFIC DESTINATION: D2 <br> TRANSMISSION END SOUND: ON <br> MELODY SOUND: S1 <br><br> [↑ PREVIOUS ITEM]  [↓ NEXT ITEM]  [CANCEL]  [SET] | 2/3 |

FIG.5

* MEMORY TRANSMISSION RESULT REPORT (2002/10/19 14:24) * P.1

1) COMPANY R
2) DEPT.1

ACCEPTED TIME: 2002/10/19 14:03

| FILE NO. | TRANSMITTING CONDITIONS | DESTINATION | DOCUMENT PAGES | RESULT |
|---|---|---|---|---|
| 0162 | MEMORY TRANSMISSION | G3: D2 | 2 | OK |

ERROR CONTENTS: e1) communication interrupted, e2) busy,
e3) no response, e4) destination not facsimile

FACSIMILE COMMUNICATION METHOD, FACSIMILE APPARATUS AND COMPUTER-READABLE STORAGE MEDIUM CONFIGURED TO OUTPUT COMMUNICATION RESULT NOTIFICATION

BACKGROUND

This disclosure claims the benefit of a Japanese Patent Application No.2002-304964 filed Oct. 18, 2002, in the Japanese Patent Office, the disclosure entire contents of which are incorporated herein by reference.

1. Technical Field

The present disclosure generally relates to facsimile communication methods, facsimile apparatuses and computer-readable storage media, and more particularly to a facsimile communication method and a facsimile apparatus which output a communication result indicative of whether or not image information is correctly transmitted to a destination apparatus, and a computer-readable storage medium which stores a computer program for causing a computer to output such a communication result.

2. Description of the Related Art

Conventionally, when an operator transmits image information from a facsimile apparatus to a destination apparatus, the operator normally wishes to confirm whether or not the image information is correctly transmitted to the destination apparatus. This confirmation may be made by automatically printing out a communication result report immediately after the transmission ends so that the operator may visually confirm the communication or, automatically outputting a melody sound to notify the end of transmission. In the latter case, the communication result can be notified to the operator by the melody sound even if the operator has moved away from the facsimile apparatus.

However, from the point of view of security, it is not always desirable to print out the communication result report because the communication result report may contain personal information. In addition, in an office environment, it is not always desirable to output the melody sound to notify the end of transmission because the melody sound may be distracting to office workers. In other words, there recently are demands to prohibit printing put the communication result report or outputting the melody sound after the transmission ends.

For example, a Japanese Laid-Open Patent Application No.7-143302 proposes a facsimile apparatus which does not output the communication result report or image information related to a secret communication.

Consequently, when the output of the communication result report or the melody sound is prohibited for security or environmental reasons, there was a problem in that it is difficult to confirm whether or not the image information is correctly transmitted from the facsimile apparatus to the destination apparatus. This is very inconvenient for the operator, particularly if the image information that is transmitted to the destination apparatus is important and/or relates to urgent matter.

SUMMARY

In an aspect of the present disclosure, a facsimile communication method, a facsimile apparatus and a computer-readable storage medium are provided wherein a communication result notification is output only with respect to a facsimile transmission which requires immediate confirmation on whether or not the facsimile transmission is correctly made to a destination apparatus, so as enable quick confirmation from the communication result notification while maintaining security.

In another aspect of the present disclosure, a facsimile apparatus is provided comprising a specific destination name storage section to store destination names of specific destinations; a receiving end identifying section to identify a receiving end by analyzing terminal information received from the receiving end when making a facsimile transmission to the receiving end; a specific destination identifying section to search from the specific destination name storage section a destination name corresponding to the receiving end which is identified by the receiving end identifying section; and a notifying section to output a communication result notification indicative of a result of the facsimile transmission to the receiving end only when the specific destination identifying section finds the corresponding destination name in the specific destination name storage section. According to the facsimile apparatus of the present invention, the communication result notification is made only with respect to the facsimile transmission to the specific destination which requires immediate confirmation on whether or not facsimile transmission was successful, that is, whether or not the image information was correctly transmitted the specific destination. For this reason, it is possible to quickly and positively notify the operator of the communication result, while maintaining security or privacy.

In another aspect of the present disclosure, a facsimile apparatus is provided comprising specific destination name storage means for storing destination names of specific destinations; receiving end identifying means for identifying a receiving end by analyzing terminal information received from the receiving end when making a facsimile transmission to the receiving end; specific destination identifying means for searching from the specific destination name storage means a destination name corresponding to the receiving end which is identified by the receiving end identifying means; and notifying means for outputting a communication result notification indicative of a result of the facsimile transmission to the receiving end only when the specific destination identifying means finds the corresponding destination name in the specific destination name storage means. According to the facsimile apparatus of the present invention, the communication result notification is made only with respect to the facsimile transmission to the specific destination which requires immediate confirmation on whether or not facsimile transmission was successful, that is, whether or not the image information was correctly transmitted the specific destination. For this reason, it is possible to quickly and positively notify the operator of the communication result, while maintaining security or privacy.

In another aspect of the present disclosure, a facsimile communication method is provided comprising storing destination names of specific destinations in a storage section; identifying a receiving end by analyzing terminal information received from the receiving end when making a facsimile transmission to the receiving end; searching from the storage section a destination name corresponding to the receiving end which is identified; and outputting a communication result notification indicative of a result of the facsimile transmission to the receiving end only when the corresponding destination name is found in the storage section. According to the facsimile communication method of the present invention, the communication result notification is made only with respect to the facsimile transmission to the specific destination which requires immediate confirmation on whether or not facsimile transmission was successful, that is, whether or not the image information was correctly transmitted the specific destination. For this reason, it is possible to quickly and positively notify the operator of the communication result, while maintaining security or privacy.

In another aspect of the present disclosure, a computer-readable storage medium is provided which stores a program for causing a computer to carry out facsimile functions, comprising a specific destination name storage procedure causing the computer to store destination names of specific destinations in a storage section; a receiving end identifying procedure causing the computer to identify a receiving end by analyzing terminal information received from the receiving end when making a facsimile transmission to the receiving end; a specific destination identifying procedure causing the computer to search from the storage section a destination name corresponding to the receiving end which is identified by the receiving end identifying section; and a notifying procedure causing the computer to output a communication result notification indicative of a result of the facsimile transmission to the receiving end only when the specific destination identifying section finds the corresponding destination name in the storage section. According to the computer-readable storage medium of the present invention, the communication result notification is made only with respect to the facsimile transmission to the specific destination which requires immediate confirmation on whether or not facsimile transmission was successful, that is, whether or not the image information was correctly transmitted the specific destination. For this reason, it is possible to quickly and positively notify the operator of the communication result, while maintaining security or privacy.

Other aspects, advantages and further features of the present invention will be apparent from the following detailed description when read in conjunction with the accompanying drawings.

BRIEF DESCRIPTION OF THE DRAWINGS

FIG. 5 is a diagram for explaining a communication result report which is printed only with respect to a specific destination.

DESCRIPTION OF THE PREFERRED EMBODIMENTS

Figure 1:
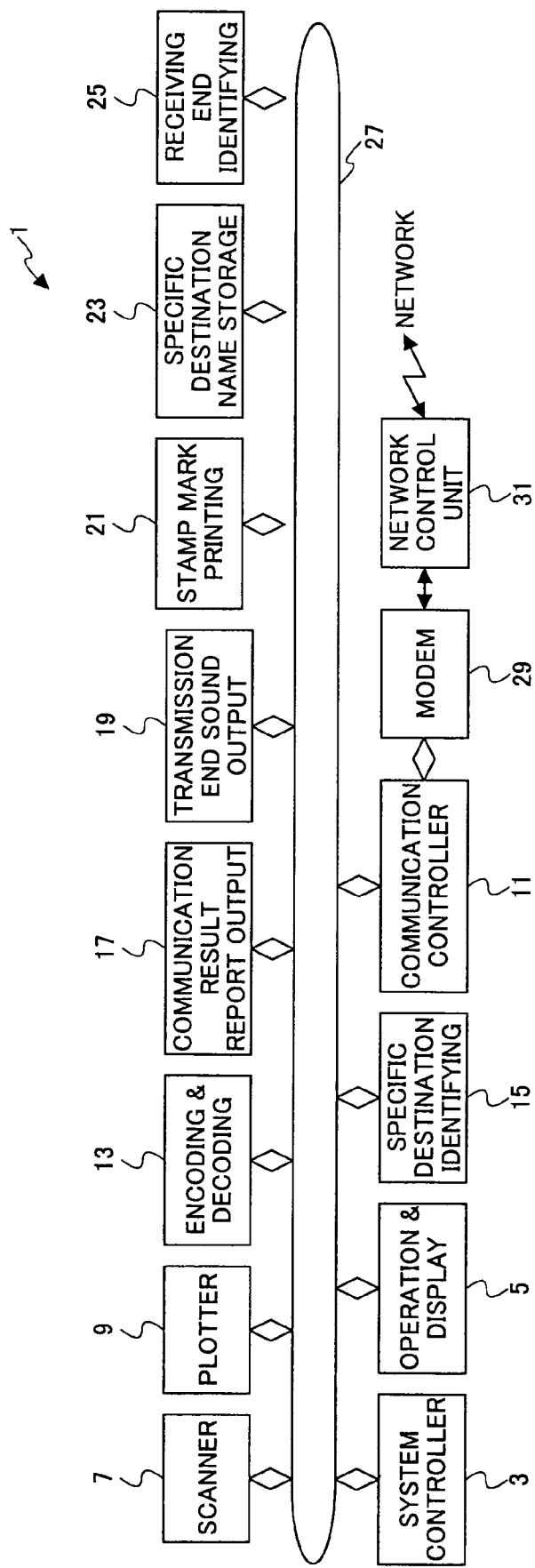
FIG. 1 is a system block diagram showing an embodiment of a facsimile apparatus according to the present invention.

FIG. 1 is a system block diagram showing an embodiment of a facsimile apparatus according to the present invention. This embodiment of the facsimile apparatus employs an embodiment of a facsimile communication method according to the present invention. A facsimile apparatus 1 shown in FIG. 1 at least includes a function of recognizing a facsimile transmission that is made to a specific destination apparatus.

As shown in FIG. 1, the facsimile apparatus 1 includes a system controller 3, an operation and display section 5, a scanner 7, a plotter 9, a communication controller 11, an encoding and decoding section 13, a specific destination identifying section 15, a communication result report output section 17, a transmission end sound output section 19, a stamp mark printing section 21, a specific destination name storage section 23, and a receiving end identifying section 25 which are connected via a system bus 27. The facsimile apparatus 1 further includes a modem 29 which is connected to the communication controller 11, and a network control unit 31 which is connected to the modem 29. The network control unit 31 is connected to a network.

The system controller 3 manages and controls the operation of the entire facsimile apparatus 1. The operation and display section 5 includes various operation keys which are operated by an operator of the facsimile apparatus 1, and various displays or indicators for displaying messages and the like to the operator. The scanner 7 scans a document, decomposes the document image into pixels at a predetermined resolution, and converts each pixel into a black-and-white image signal, for example. The plotter 9 prints an image with the same resolution as that of the scanner 7.

The communication controller 11 carries out a facsimile transmission according to a predetermined transmission control procedure, and carries out a facsimile reception according to a predetermined reception control procedure. The encoding and decoding section 13 encodes transmitting image information which is to be transmitted according to a predetermined encoding scheme, so as to compress the amount of information of the image information. The encoding and decoding section also decodes encoded received image information which is received, so as to restore the original image information.

The specific destination identifying section 15 identifies (or distinguishes) a facsimile transmission to a specific destination. The communication result report output section 17 outputs a communication result report which is to be printed by the plotter 9 or displayed on the operation and display section 5, after the facsimile transmission to the specific destination ends. The communication result report includes contents of communication results including communication logs and the like. The transmission end sound output section 19 outputs a melody sound which is specified by the operator depending on the specific destination, after the facsimile transmission ends.

The stamp mark printing section 21 judges whether or not to print a stamp mark on the document which is read in a normal manner by the scanner 7 when making the facsimile transmission to the specific destination. The stamp mark printing section 21 may also control a printing position of the stamp mark on the document which is scanned (read), depending on a setting which is made by the operator from the operation and display section 5. The printed stamp mark on the document indicates that the document has been scanned or, has been scanned and transmitted to the specific destination. The stamp mark printing section 21 may print the stamp mark on the document by a stamper which is provided within the plotter 9 or provided separately from the plotter 9. Alternatively, the stamp mark printing section 21 may print the stamp mark on the document using the plotter 9.

The specific destination name storage section 23 stores names of specific destinations. The receiving end identifying section 23 identifies the receiving end apparatus when making the facsimile transmission, by analyzing terminal information received from the receiving end apparatus.

The specific destination identifying section 15 may register destination names which are identifiable by protocol, such as Receiver Terminal Identification (RTI), Called Subscriber Identification (CSI) and receiving end terminal identifier of the specific destinations, in the specific destination name storage section 23, so as to enable identification of the facsimile transmission to the specific destination. The specific destination identifying section 15 may also register telephone number information and destination names which are specified by a quick-registration, in the specific destination name storage section 23, so as to enable identification of the facsimile transmission to the specific destination.

When making the facsimile transmission to the specific destination, the specific destination identifying section 15 searches for the destination name corresponding to the receiving end identified by the receiving end identifying section 25, from the specific destination name storage section 23. When the destination name corresponding to the receiving end identified by the receiving end identifying section 25 is found from the specific destination name storage section 23, the specific destination identifying section 15 instructs a predetermined transmission result notifying process to the communication result report output section 17.

The specific destination name storage section 23 may also store telephone number information input from the operation and display section 5 by the operator, and destination names specified by the quick-registration.

The modem 29 modulates the transmitting information which is received via the communication controller 11 and is to be transmitted, and demodulates the received information which is received via the network control unit 31. The network control unit 31 transmits the transmitting information to the network such as a public telephone line. In addition, the received information is received by the network control unit 31 via the network.

By using the above described structure of the facsimile apparatus 1, this embodiment can control the output of the communication result report corresponding to the specific destination. At the same time, this embodiment enables a positive judgement to be made on whether the image information was correctly transmitted to the specific destination or the transmission to the specific destination failed. Hence, when the facsimile apparatus 1 is located on the receiving end, it is possible to quickly exchange information with a transmitting end, and positively transmit necessary and/or requested information, such as the terminal information, to the transmitting end, because the necessary and/or requested information is transmitted to the transmitting end for use in making the communication result report at the transmitting end regardless of the general setting of the receiving end.

Figure 2:
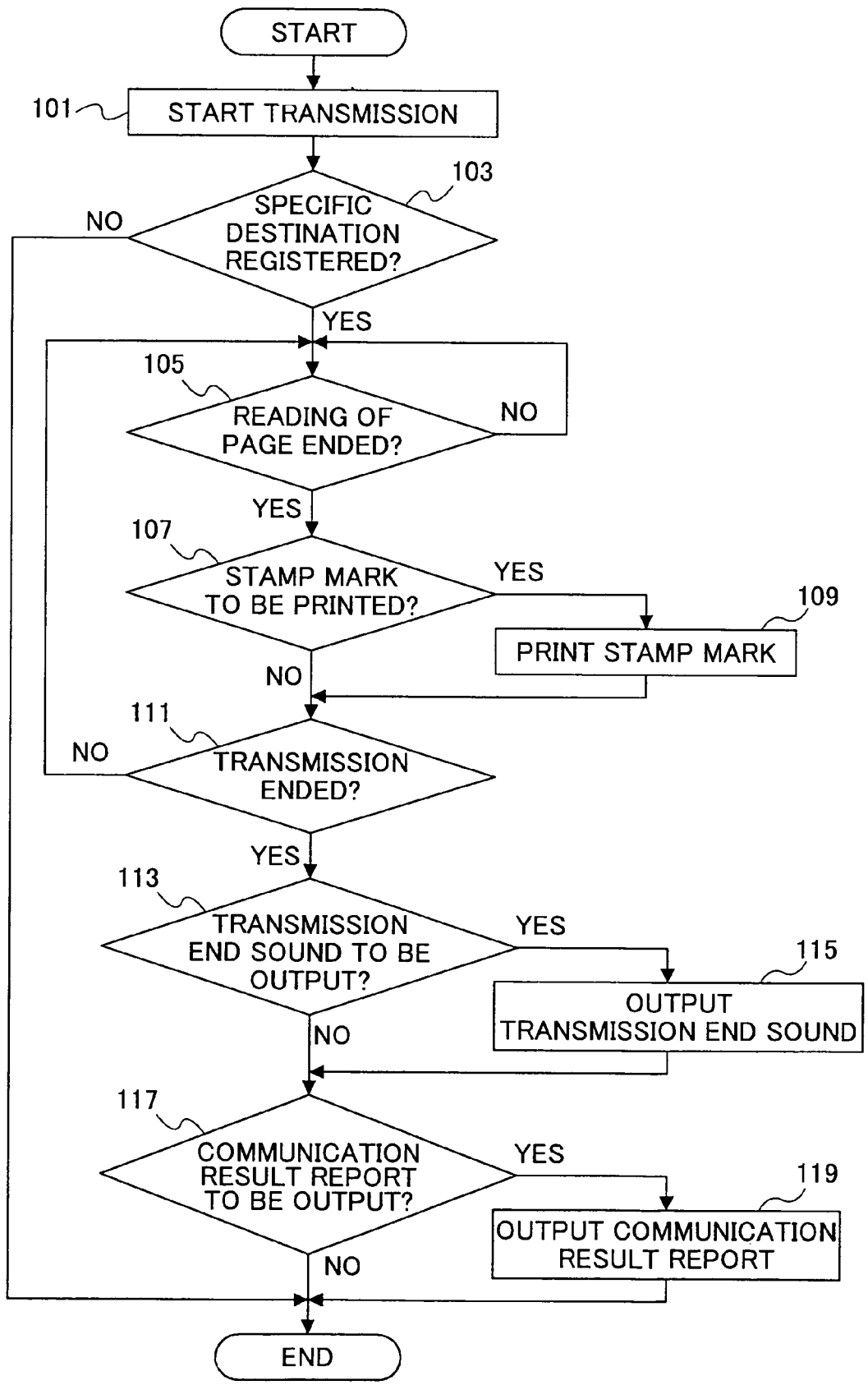
FIG. 2 is a flow chart for explaining an operation of the facsimile apparatus shown in FIG. 1.

Next, a description will be given of an operation of the facsimile apparatus 1 shown in FIG. 1, by referring to FIG. 2. FIG. 2 is a flow chart for explaining the operation of the facsimile apparatus 1.

When a step 101 starts a facsimile transmission of the facsimile apparatus 1 in FIG. 1, a step 103 decides whether or not a destination (receiving end) is one of the specific destinations registered in the specific destination name storage section 23. In other words, the receiving end identifying section 25 identifies the receiving end (destination) by analyzing the terminal information which is received from the receiving end when the facsimile transmission is made to the receiving end, and the specific destination identifying section 15 judges whether or not the identified receiving end is registered as one of the specific destinations in the specific destination name storage section 23.

If the decision result in the step 103 is YES, a step 105 decides whether or not the reading of a page of a document has ended, and the step 105 is repeated until the decision result becomes YES. If the decision result in the step 105 is YES, a step 107 decides whether or not to print the stamp mark on the document page. In other words, the stamp mark printing section 21 judges whether or not the stamp mark is to be printed on the document page which has been read in a normal manner by the scanner 7 when making the facsimile transmission to the specific destination or, judges whether or not the printing of the stamp mark at an arbitrary position of the document page has been set (instructed) by a user operation.

If the decision result in the step 107 is YES, a step 109 prints the stamp mark on the document page or, prints the stamp mark at the arbitrary position of the document page set by the user operation depending on the specific destination. The process advances to a step 111 after the step 109 of if the decision result in the step 107 is NO.

Figures 3, 4:
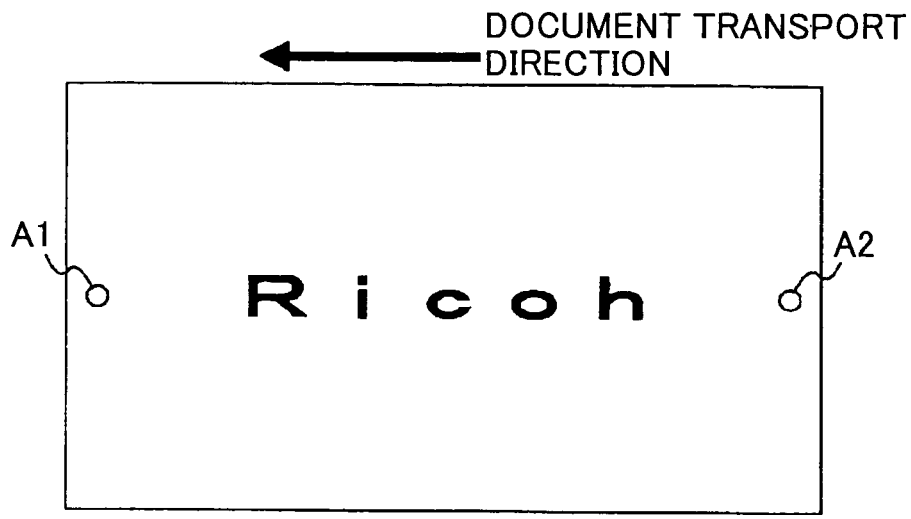
FIG. 3 is a diagram for explaining printing of a stamp mark on a document.
FIG. 4 is a diagram for explaining a displayed setting menu for selecting melody sound.

FIG. 3 is a diagram for explaining the printing of the stamp mark on the document page. FIG. 3 shows a case where the document page contains an image "Ricoh", and a document transport direction is indicated by an arrow. For example, the stamp mark is printed at a position A1 for the facsimile transmission to a specific destination D1, and the stamp mark is printed at a position A2 for the facsimile transmission to a specific destination D2. In this embodiment, the stamp mark has a circular shape, but the shape and the number of marks forming the stamp mark is not limited to those of this embodiment. For example, two or more marks, having the same or different shapes, may form the stamp mark. Preferably, the stamp mark is printed on a side of the document page opposite to the side containing the image, particularly when the document page which is scanned contains images on both sides.

Therefore, since the stamp mark is printed on the document page at a position which is set by the operator depending on the specific destination, the operator can positively confirm the facsimile transmission to the specific destination by visually confirming the position of the stamp mark printed on the document page.

Of course, the stamp mark may be printed on the document page in a manner other than the above, as long as it enables identification of the specific destination to which the image of the document page is transmitted. For example, the color of the stamp mark and/or the shape of the stamp mark may be changed depending on the specific destination. In other words, it is possible to change the position and/or color and/or shape of the stamp mark, depending on the specific destination.

The step 111 decides whether or not the facsimile transmission has ended. The process returns to the step 105 if the decision result in the step 111 is NO. If the decision result in the step 111 is YES, a step 113 decides whether or not a transmission end sound is to be output. If the decision result in the step 113 is YES, a step 115 outputs the transmission end sound. In other words, the transmission end sound output section 19 outputs a melody sound which is specified by the operator depending on the specific destination, when the facsimile transmission ends.

FIG. 4 is a diagram for explaining a displayed setting menu for selecting the melody sound. When the operator selects the setting menu from the operation and display section 5, the setting menu shown in FIG. 4 is displayed on the operation and display section 5 with respect to the specific destination. The setting menu displays the specific destination as an item, and the operator turns ON/OFF the transmission end sound. Further, in a case where the transmission end sound is turned ON, the operator selects the melody sound for the specific destination. In the particular case shown in FIG. 4, "⅔" indicates that the transmission end sound is being set for the second item, that is, the second specific destination D2, of the three items, and the transmission end sound is turned ON and selected to a melody sound S1 of ten possible melody sounds S1 through S10.

The setting menu for a previous item is displayed when a "previous item" button is operated, and the setting menu for a next item is displayed when a "next item" button is operated. The setting of the transmission end sound is cancelled when a "cancel" button is operated. When a "set" button is operated, the ON/OFF state of the transmission end sound and the selected melody sound are set with respect to the item (specific destination).

Therefore, the melody sound which may be set differently for each specific destination is output when the facsimile transmission ends, to thereby enable the operator to positively confirm from the melody sound that the facsimile transmission to the specific destination has ended.

After the step 115 or if the decision result in the step 113 is NO, a step 117 decides whether or not to output the communication result report. If the decision result in the step 117 is YES, a step 119 outputs the communication result report, and the process ends. In other words, if the decision result in the step 117 is YES, the communication result report output section 17 prints a communication result report shown in FIG. 5, for example, by the plotter 9. Alternatively, the communication result report output section 17 may display the communication result report on the operation and display section 5.

FIG. 5 is a diagram for explaining the communication result report which is printed only with respect to the specific destination. FIG. 5 shows a case where the communication result report includes a memory transmission result report. This memory transmission result report includes the time and date of the report, the time and date of acceptance of the memory transmission, the file number assigned to the memory transmission, the transmitting conditions, the destination, the number of document pages, and the result of the facsimile transmission. The memory transmission is a kind of store-and-forward facsimile transmission, and is made after scanning the document image into a memory of the facsimile apparatus, and the actual transmission of the stored document image may be made at an arbitrary time or at a time specified by the operator.

In FIG. 5, a bottom portion of the memory transmission result report includes a description of error codes e1) through e4) which are displayed under the result of the facsimile transmission if the facsimile transmission fails. However, a code "OK" is indicated under the result of the facsimile transmission in this particular case because the facsimile transmission is successful. In FIG. 5, "1) COMPANY R" and "2) DEPT. 1" indicated in a top right portion under the heading "MEMORY TRANSMISSION RESULT REPORT (2002/10/19 14:24)" indicates two kinds of transmitting end names which may be set in this particular case. Of course, it is possible to indicate only one kind of transmitting end name or, not to indicate the transmitting end name, to suit the user's needs.

Therefore, the communication result report is output only when the facsimile transmission to the specific destination ends, to thereby enable the operator to positively confirm from the communication result report that the facsimile transmission to the specific destination has ended. Of course, the contents and/or format of the communication result report may be set differently for each specific destination. In this case, it is not essential to include the specific destination in the communication result report, because the specific destination can be identified from the contents and/or format of the communication result report, to thereby maintain security or privacy.

The process ends if the decision result in the step 117 shown in FIG. 2 is NO. In addition, the process also ends if the decision result in the step 103 is NO.

The stamp mark printed in the step 109, the transmission end sound output in the step 115, and the communication result report output in the step 119 may combined arbitrarily by the operator to suit the operator's needs and/or the environment in which the facsimile apparatus 1 is used. In other words, the communication result notification which is only made with respect to the facsimile transmission to the specific destination, may be any one or combinations of the communication result notifications made in the steps 109, 115 and 119.

Therefore, according to this embodiment, the communication result notification is made only with respect to the facsimile transmission to the specific destination which requires immediate confirmation on whether or not facsimile transmission was successful, that is, whether or not the image information was correctly transmitted the specific destination. For this reason, it is possible to quickly and positively notify the operator of the communication result, while maintaining security or privacy.

When the communication result notification is made immediately after the facsimile transmission to the specific destination ends, it is possible for the operator of the facsimile apparatus to quickly obtain the communication result while maintaining security, even in an office environment in which more than one person uses the facsimile apparatus.

When the communication result notification is made by printing or displaying the communication result report immediately after the facsimile transmission to the specific destination ends, it is possible for the operator of the facsimile apparatus to visually and accurately confirm the communication result, even when the operator moves away from the facsimile apparatus before the facsimile transmission ends. Accordingly, it is possible to quickly recognize an error such as failed transmission and transmission to an erroneous destination, by looking at the communication result report. Furthermore, it is possible to quickly find out the cause of the error from a communication log contained in the communication result report.

When the communication result notification is made by outputting the transmission end sound immediately after the facsimile transmission to the specific destination ends, it is possible for the operator of the facsimile apparatus to immediately confirm the communication result from the sound, even when the operator moves away from the facsimile apparatus before the facsimile transmission ends.

When the communication result notification is made by printing the stamp mark on the document page, it is possible for the operator of the facsimile apparatus to visually and accurately confirm the scanning of the document page. Hence, it is possible to quickly recognize a scanning error and remedy the error, so as to minimize transmission errors.

Since the communication result notification which is only made with respect to the facsimile transmission to the specific destination, may be any one or combinations of the communication result notifications made in the steps 109, 115 and 119 described above, it is possible for the operator of the facsimile apparatus to freely select the kind or combination of the communication result notification to suit the operator's needs, such as importance and urgency of the facsimile transmission.

Next, a description will be given of an embodiment of a computer-readable storage medium according to the present invention. The computer-readable storage medium is formed by a recording medium capable of storing a computer program. The recording medium may be selected from any suitable media including magnetic, optical and magneto-optical recording media, and semiconductor memory devices. The computer program stored in the computer-readable storage medium includes procedures for causing a computer or computer system to carry out the facsimile functions of the facsimile apparatus 1 described above.

The computer or computer system may be formed by any suitable general purpose computer, such as a personal computer, including a CPU, a memory, an input device such as a keyboard and a mouse, and a display unit. The personal computer may be connected to a printer and to a scanner, if necessary. In this case, the functions of at least the system controller 3, the communication controller 11, the encoding and decoding section 13, the specific destination identifying section 15, the communication result report output section 17, the transmission end sound output section 19, the stamp mark printing section 21, and the receiving end identifying section 25 are realized by the CPU, and the specific destination name storage section is realized by the memory. The operation and display section 5 may be realized by the input device and the display unit. The plotter 9 and the stamper are realized by the printer. The functions of the modem 29 and the network control unit 31 may be additionally realized by the CPU.

In the embodiment described above, the specific destination identifying section 15 may register the telephone number information and the destination names which are specified by a quick-registration in units of destination groups, in the specific destination name storage section 23, so as to enable identification of the facsimile transmission to the specific destination. In this case, the registration of the specific destinations can be simplified by making the registration in units of destination groups.

Further, the present invention is not limited to these embodiments, but various variations and modifications may be made without departing from the scope of the present invention.

What is claimed is:

1. A facsimile apparatus comprising:
a specific destination name storage section configured to store destination names of specific destinations,
said specific destination name storage section storing additionally for each specific destination an indication of a kind of notification to be output when a facsimile transmission is made to the specific destination;
a receiving end identifying section configured to identify a receiving end by analyzing terminal information received from the receiving end when making a facsimile transmission to the receiving end;
a specific destination identifying section configured to search the specific destination name storage section for a destination name corresponding to the receiving end to which said facsimile transmission is being made and which is identified by the receiving end identifying section; and
a notifying section configured to output a communication result notification, indicative of a result of the facsimile transmission to the receiving end, when the facsimile communication ends,
said notifying section outputting the communication result notification, in accordance with the kind of notification associated with the corresponding destination name stored in the specific destination name storage section.

2. The facsimile apparatus as claimed in claim 1, wherein the notifying section outputs a communication result report for each facsimile transmission made to the receiving end having the corresponding destination name stored in the specific destination name storage section.

3. The facsimile apparatus as claimed in claim 2, wherein the communication result report has contents and/or format set differently for each specific destination.

4. The facsimile apparatus as claimed in claim 2, wherein the notifying section displays or prints the communication result report.

5. The facsiinile apparatus as claimed in claim 1, wherein the notifying section outputs a transmission end sound for each facsimile transmission made to the receiving end having the corresponding destination name stored in the specific destination name storage section.

6. The facsimile apparatus as claimed in claim 5, wherein the transmission end sound is set differently for each specific destination.

7. The facsimile apparatus as claimed in claim 1, wherein the notifying section prints a stamp mark on a scanned document for each facsimile transmission made to the receiving end having the corresponding destination name stored in the specific destination name storage section.

8. The facsimile apparatus as claimed in claim 7, wherein the stamp mark is set differently for each specific destination.

9. The facsimile apparatus as claimed in claim 1, wherein the communication result report, the transmission end sound, and the stamp mark are set differently for each specific destination.

10. A facsimile apparatus comprising:
specific destination name storage means for storing destination names of specific destinations, and for storing additionally for each specific destination an indication of a kind of notification to be output when a facsimile transmission is made to the specific destination;
receiving end identifying means for identifying a receiving end by analyzing terminal information received from the receiving end when making a facsimile transmission to the receiving end;
specific destination identifying means for searching from the specific destination name storage means a destination name corresponding to the receiving end to which said facsimile transmission is being made and which is identified by the receiving end identifying means; and
notifying means for outputting a communication result notification, indicative of a result of the facsimile transmission to the receiving end, when the facsimile communication ends,
said notifying means outputting the communication result notification, in accordance with the kind of notification associated with the corresponding destination name stored in the specific destination name storage means.

11. The facsimile apparatus as claimed in claim 10, wherein the communication result report, the transmission end sound, and the stamp mark are set differently for each specific destination.

12. A facsimile communication method comprising:
(a) storing destination names of specific destinations in a storage section and storing additionally for each specific destination an indication of a kind of notification to be output when a facsimile transmission is made to the specific destination;
(b) identifying a receiving end by analyzing terminal information received from the receiving end when making a facsimile transmission to the receiving end;
(c) searching the storage section for a destination name corresponding to the receiving end, identified in (b) and to which said facsimile transmission is being made; and
(d) outputting a communication result notification, indicative of a result of the facsimile transmission to the receiving end, when the facsimile communication ends, the communication result notification is output in (d) in accordance with the kind of notification associated with the corresponding destination name stored in the storage section.

13. The facsimile communication method as claimed in claim 12, wherein the outputting outputs a communication result report for each facsimile transmission made to the receiving end having the corresponding destination name stored in the storage section.

14. The facsimile communication method as claimed in claim 13, wherein the communication result report has contents and/or format set differently for each specific destination.

15. The facsimile communication method as claimed in claim 13, wherein the outputting displays or prints the communication result report.

16. The facsimile communication method as claimed in claim 12, wherein the outputting outputs a transmission end sound for each facsimile transmission made to the receiving end having the corresponding destination name stored in the storage section.

17. The facsimile communication method as claimed in claim 16, wherein the transmission end sound is set differently for each specific destination.

18. The facsimile communication method as claimed in claim 12, wherein the outputting prints a stamp mark on a scanned document for each facsimile transmission made to the receiving end having the corresponding destination name stored in the storage section.

19. The facsimile communication method as claimed in claim 18, wherein the stamp mark is set differently for each specific destination.

20. The facsimile communication method as claimed in claim 12, wherein the communication result report, the transmission end sound, and the stamp mark are set differently for each specific destination.

21. A computer-readable medium tangibly embodying a program of instructions for causing a computer to carry out a facsimile communication method, said method comprising:
- a specific destination name storage step storing destination names of specific destinations in a storage section and storing additionally for each specific destination an indication of a kind of notification to be output when a facsimile transmission is made to the specific destination;
- a receiving end identifying step identifying a receiving end by analyzing terminal information received from the receiving end when making a facsimile transmission to the receiving end;
- a specific destination identifying step searching in the storage section for a destination name corresponding to the receiving end, identified in the receiving end identifying step and to which said facsimile transmission is being made; and
- a notifying step outputting a communication result notification, indicative of a result of the facsimile transmission to the receiving end, when the facsimile communication ends,
- the communication result notification is output in the notifying step in accordance with the kind of notification associated with the corresponding destination name stored in the storage section.

22. The computer-readable medium as claimed in claim 21, wherein the notifying step causes the computer to output a communication result report for each facsimile transmission made to the receiving end having the corresponding destination name stored in the storage section.

23. The computer-readable medium as claimed in claim 22, wherein the communication result report has contents and/or format set differently for each specific destination.

24. The computer-readable medium as claimed in claim 22, wherein the notifying step causes the computer to display or print the communication result report.

25. The computer-readable medium as claimed in claim 21, wherein the notifying step causes the computer to output a transmission end sound for each facsimile transmission made to the receiving end having the corresponding destination name stored in the storage section.

26. The computer-readable medium as claimed in claim 25, wherein the transmission end sound is set differently for each specific destination.

27. The computer-readable medium as claimed in claim 21, wherein the notifying step causes the computer to print a stamp mark on a scanned document for each facsimile transmission made to the receiving end having the corresponding destination name stored in the storage section.

28. The computer-readable medium as claimed in claim 27, wherein the stamp mark is set differently for each specific destination.

29. The computer-readable medium as claimed in claim 21, wherein the communication result report, the transmission end sound, and the stamp mark are set differently for each specific destination.

30. The facsimile apparatus as claimed in claim 1, wherein the notifying section outputs the communication result notification to the receiving end, only when the specific destination identifying section finds the corresponding destination name in the specific destination name storage section and the indication of the kind of notification to be output is stored for the receiving end in the specific destination name storage section.

31. The facsimile apparatus as claimed in claim 10, wherein the notifying means outputs the communication result notification to the receiving end, only when the specific destination identifying means finds the corresponding destination name in the specific destination name storage means and the indication of the kind of notification to be output is stored for the receiving end in the specific destination name storage means.

32. The facsimile communication method as claimed in claim 12, wherein the communication result notification is output in said (d) only when the corresponding destination name is found in the storage section and the indication of the kind of notification to be output is stored for the receiving end in the storage section.

33. The computer-readable medium as claimed in claim 21, wherein the communication result notification is output in the notifying step only when the corresponding destination name is found in the storage section in the specific destination identifying step and the indication of the kind of notification to be output is stored for the receiving end in the storage section.

* * * * *